(12) United States Patent
Kitchener et al.

(10) Patent No.: US 9,046,879 B2
(45) Date of Patent: Jun. 2, 2015

(54) FAULT PROTECTION CIRCUIT FOR IEC 61158 FIELDBUS SPUR AND METHOD OF USING THE SAME

(75) Inventors: Renato Kitchener, West Sussex (GB); Steffen Graber, Mannheim (DE)

(73) Assignee: Pepperl + Fuchs GmbH (DE)

( * ) Notice: Subject to any disclaimer, the term of this patent is extended or adjusted under 35 U.S.C. 154(b) by 375 days.

(21) Appl. No.: 13/699,045

(22) PCT Filed: May 24, 2011

(86) PCT No.: PCT/GB2011/000788
§ 371 (c)(1),
(2), (4) Date: Nov. 20, 2012

(87) PCT Pub. No.: WO2011/147127
PCT Pub. Date: Dec. 1, 2011

(65) Prior Publication Data
US 2013/0063847 A1    Mar. 14, 2013

(30) Foreign Application Priority Data
May 24, 2010   (GB) .................................. 1008536.3

(51) Int. Cl.
| | |
|---|---|
| H02H 9/08 | (2006.01) |
| G05B 9/02 | (2006.01) |
| G05B 19/042 | (2006.01) |
| G05B 19/05 | (2006.01) |
| H02H 3/08 | (2006.01) |
| H02H 9/02 | (2006.01) |
| H02H 9/00 | (2006.01) |

(52) U.S. Cl.
CPC .............. *G05B 9/02* (2013.01); *G05B 19/0428* (2013.01); *G05B 19/058* (2013.01); *G05B 2219/14011* (2013.01); *G05B 2219/24028* (2013.01)

(58) Field of Classification Search
USPC ......................................................... 361/93.9
See application file for complete search history.

(56) References Cited

U.S. PATENT DOCUMENTS 7,342,761 B2 *   3/2008   Covault ........................ 361/93.1
7,535,691 B2 *   5/2009   Mayell ......................... 361/93.1
(Continued)

FOREIGN PATENT DOCUMENTS

EP   0883045 A2   12/1998
EP   1503259 A2   2/2005
(Continued)

OTHER PUBLICATIONS

EP 1503259; In-line passive barrier for safe communication network; abstract, specification.*
(Continued)

*Primary Examiner* — Dharti Patel
(74) *Attorney, Agent, or Firm* — Lerner, David, Littenberg, Krumholz & Mentlik, LLP

(57) ABSTRACT

A fault protection circuit for use on a spur of an IEC 61158 Fieldbus network comprising a fast acting current limiter adapted to limit the spur current to the level of a reference current when the spur current reaches said reference current, control means adapted to monitor the spur AC and/or DC current and/or voltage, and isolation means adapted to apply a shunt short circuit isolation to said spur upon receipt of an activation signal from the control means, in which the control means is adapted to control the level of the reference current, and in which when said control means detects one or more pre-determined fault conditions on said spur it activates the isolation means and lowers the level of reference current.

8 Claims, 2 Drawing Sheets

(56) References Cited

U.S. PATENT DOCUMENTS

Figure 1:
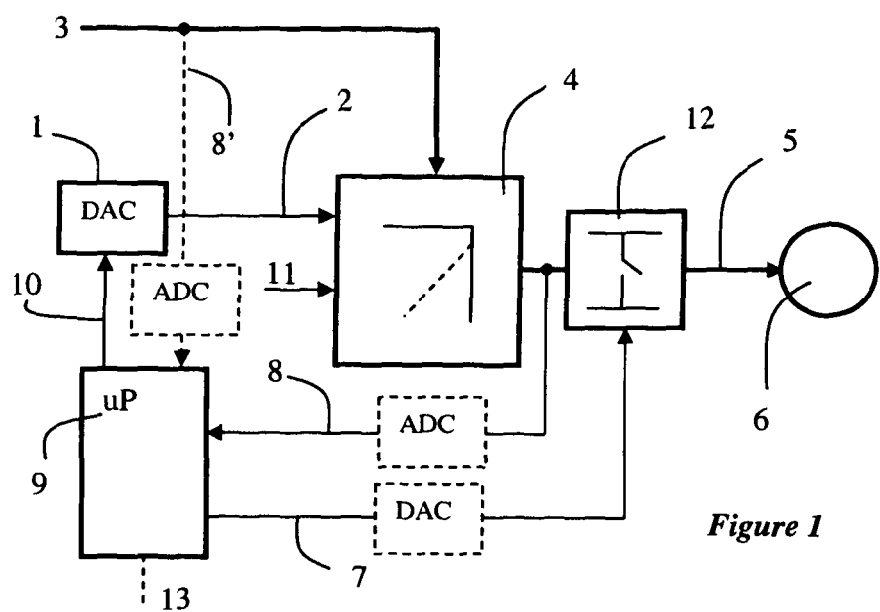

| | | | |
|---|---|---|---|
| 2002/0176216 A1* | 11/2002 | Del Signore, II et al. | ... 361/93.9 |
| 2008/0088998 A1* | 4/2008 | So | ................. 361/93.9 |
| 2008/0180226 A1 | 7/2008 | Schmidt | |
| 2010/0027180 A1* | 2/2010 | Bingel et al. | ................. 361/93.9 |

FOREIGN PATENT DOCUMENTS

| | | | |
|---|---|---|---|
| EP | 1752842 A1 | 2/2007 | |
| WO | 2008139172 A2 | 11/2008 | |

OTHER PUBLICATIONS

EP 1752842.*

International Search Report for Application No. PCT/GB2011/000788 dated Jul. 28, 2011.

International Preliminay Report on Patentability for Application No. PCT/GB2011/000788 dated Nov. 27, 2012.

* cited by examiner

FAULT PROTECTION CIRCUIT FOR IEC 61158 FIELDBUS SPUR AND METHOD OF USING THE SAME

CROSS-REFERENCE TO RELATED APPLICATIONS

The present application is a national phase entry under 35 U.S.C. §371 of International Application No. PCT/GB2011/000788 filed May 24, 2011, published in English, which claims priority from Great Britain Application No. 1008536.3 filed May 24, 2010, all of which are incorporated herein by reference.

The present invention relates to an improved fault protection circuit for use with a spur (or just a device) of an IEC 61158 Fieldbus network, which has both static and dynamic protection functions and advanced annunciation and control, and a method of using the fault protection circuit.

Fieldbus (or field bus) is the name of a family of industrial computer network protocols used for real-time distributed control, now standardized as IEC 61158. A complex automated industrial system, for example a fuel refinery, usually needs an organized hierarchy of controller systems to function. In this hierarchy there is a Human Machine Interface (HMI) at the top, where an operator can monitor or operate the system. This is typically linked to a middle layer of programmable logic controllers (PLC) via a non time critical communications system (e.g. Ethernet). At the bottom of the control chain is the fieldbus, which links the PLCs to the components which actually do the work such as sensors, actuators, electric motors, console lights, switches, valves and contactors.

Fieldbus is often used in Intrinsically Safe environments, for example combustible atmospheres, and in particular gas group classification IIC, Hydrogen and Acetylene, and below, for example gas group IIB and IIA, for gas and/or dust. Using the Fieldbus protocol, field instruments and equipment in such an environment are controlled and monitored remotely via an electrical communications circuit often provided in the same electrical circuit as the power to drive the field instruments.

In a typical Fieldbus electrical power and communications circuit there is a power supply, an Intrinsic Safety barrier of some kind, a trunk section leading out into the field, and a number of device couplers with spurs connected thereto, on which the field instruments are mounted. The trunk and the spurs together form a segment. The Intrinsic Safety barrier divides the circuit into an Intrinsically Safe side and a non-Intrinsically Safe side. The power supply, the PLCs and other systems like physical layer diagnostic modules which measure physical layer attributes of the electrical circuit and the network hardware, and in part the physical software or protocol being used, are located in the non-Intrinsically Safe side of the circuit, usually in a control room. The trunk, the device couplers, the spurs and the field instruments are located in the Intrinsically Safe side, out in the field.

Intrinsic Safety can be achieved in a number of known ways, from simply limiting the power so open or short circuits cannot form combustible arcs, to using active monitoring and isolating systems which allow higher power levels and act to isolate the power supply from open or short circuits to prevent combustible arcs.

In addition, it is also common to use current limiting protection electronics within active device couplers, which act to limit the current in a particular spur if a short circuit occurs thereon. Current limiting devices like this comprise a series semiconductor element and a current sense/drive circuit. The circuit monitors the current on the spur, and if it reaches a trip level as a result of a short circuit occurring on the spur the semiconductor is switched to limit the current. The circuit either works in a rectangular way and limits the current to the trip level itself, or it works in a foldback way and limits the current to a lower level.

Spur short circuits can occur for example when there is an inadvertent cable make, or if a device itself fails to a short circuit state, which could result from electronic component failure or even flooding of the instrument enclosure. The current limiting electronics prevent any such faults from short circuiting the trunk. Short circuits can also occur when a device is disconnected or when errors occur during routine maintenance and calibration, so the current limiting electronics acts as a safeguard and allows for routine work to be carried out on an active spur without the danger of it affecting other parts of the circuit. The current range of two wire IEC61158 Fieldbus spur current limiting protection electronics within active device couplers includes the Segment Protector® and Spur Guard® products.

However, these current limiting devices are limited in their application because they are only designed to deal with spur or device faults which are constant or intermittent low DC ohmic short circuits. They are not designed to deal with AC impedance short circuits for example. Further, the protection electronics only isolates faults by presenting high or infinite impedance isolation (including open circuit). Therefore, all prior art arrangements only offer spur, trunk or segment protection for one type of fault, namely a low ohmic DC fault. It will be appreciated that this type of fault is not the only fault that can cause a Fieldbus segment to fail. In practice, there are countless other spur and device faults that can cause a segment to fail, and which cannot be isolated. For example, such faults include:

i) a device in "jabber mode", where a faulty device transmits a continuous signal which overlaps, or interferes with other legitimate signals. This type of fault is an AC fault, ii) a legitimate intermittent current attachment, for example the intermittent connection of a 20mA device on a 50mA current limited spur, or an intermittent make-break of the spur cable, iii) a creeping or static fault which exhibits high resistance but low impedance. Such faults can be caused by failures in the cable or the device, for example cable water ingress or circuitry failure, iv) a creeping fault which exhibits low resistance but high impedance. Such faults can modulate a rectangular current limiter without reaching a high enough level to cause the foldback circuit to operate, v) a high resistance series fault which causes a device to intermittently disconnect and reconnect at currents below the current trip level of the current limiter, which causes voltages lower than the device excitation voltage to occur, which results in the device intermittently switching on and off, vi) a potential over/under current modulation from devices, and vii) cyclic spikes which are slow enough to activate rectangular current limiting, but fast enough not to cause the protection electronics to enter a foldback mode.

In addition to the above, known current limiters can only handle the faults they are designed to deal with in a limited number of ways. In particular, it is only known to provide the following functions:

i) a fast acting DC rectangular current limit using one or two stages, ii) a foldback to zero current for a set time limit, then a step or integrated reversion back to a rectangular current limit for a short time, or alternatively a reversion back to normal operating conditions if the fault is clear or back to into a foldback mode if the fault remains, iii) a foldback mode for a pre-determined and constant time. This can be initiated when particular fault types are detected.

In each of the above cases fault protection is only initiated in a fixed over-current situation, and only at the point in the circuit where the current limiting electronics is located. More importantly, the known systems only monitor the DC current going into the fault, and there is therefore no way to diagnose the impedance of a fault.

The present invention is intended to overcome some of the above problems.

Therefore, according to a first aspect of the present invention, a fault protection circuit for use on a spur of an IEC 61158 Fieldbus network comprises a fast acting current limiter adapted to limit the spur current to the level of a reference current when the spur current reaches said reference current, control means adapted to monitor the spur AC and/or DC current and/or voltage, and isolation means adapted to apply a shunt short circuit isolation to said spur upon receipt of an activation signal from the control means, in which the control means is adapted to control the level of the reference current, and in which when said control means detects one or more pre-determined fault conditions on said spur it activates the isolation means and lowers the level of reference current.

(It will be appreciated that in practice a Fieldbus spur will comprise a number of separate devices, however the word "spur" herein is intended to define a section of a Fieldbus network which could comprise one or more devices. It could comprise just a single device connected directly to a trunk bus, as this would still constitute a "spur" in the network topology.)

Thus, the present invention involves the use of a control means to monitor various physical layer characteristics of the spur, which can then act to isolate the spur when one or more predetermined faults is detected. In essence, the invention involves detecting the kinds of faults listed above which are not handled by known current limiting devices, for example AC modulation faults, creeping faults and so on, and then deliberately creating a clean fault in the form of a shunt short circuit. In this way the current limiter is forced into action to handle this contrived "fault", and does not remain inactive. The level of the current reference is lowered in order to protect a current sense series element part of the current limiter from overheating when the shunt short circuit is applied, but this is also provides for an advantageous fault probing tool, described further below. Lowering the current reference is effectively the application of a low current foldback mode to the current limiter, which otherwise would operate in a rectangular fashion.

The various different ways in which the above features can be put into effect in a circuit will be appreciated by the skilled person. However, in a preferred embodiment the isolation means can comprise a first MOSFET mounted across the rails of the spur, which can be driven to a short circuit state upon receipt of the activation signal at a gate terminal thereof.

This is advantageous because the first MOSFET can present total balanced spur output isolation from the fault. The first MOSFET can be a low ohmic rail to rail MOSFET for example, so that no current will flow into a low resistance or low impedance, high resistance fault, but current will flow through the current limiter, and any associated diagnostic system, for example a fault annunciation circuit.

In a preferred construction the activation signal from the control means can be supplied to a gate terminal of a second MOSFET, and a drain terminal of the second MOSFET can be supplied to the gate terminal of the first MOSFET. This way an inverter circuit is provided to activate the first MOSFET in an efficient way.

The current limiter can comprise a third MOSFET and an op-amp. A source terminal of the third MOSFET can be fed to a negative terminal of the op-amp and the reference current can be fed to a positive terminal of the op-amp. An output of the op-amp can be fed to a gate terminal of the third MOSFET, such that when the spur current reaches the reference current the third MOSFET is controlled to limit the spur current to the level of the reference current. This is a known current limiter arrangement. However, in addition a fourth MOSFET can be mounted in series with said reference current, a gate terminal thereof being controlled by the control means thereby to control the level of the reference current.

Therefore, the control means can control the level of the reference current simply, by adjusting a current supplied to the fourth MOSFET.

In one construction the control means can be a microcontroller, and the activation signal can comprise a disable signal which can be fed to the gate terminals of both the second and fourth MOSFETs. With this construction a single disable signal simultaneously activates the isolation means and lowers the level of reference current.

The micro controller can monitor the spur in any known way and can be programmed to detect any physical layer fault desired, either by direct sensing or by inference. It is effectively a slower acting protection arrangement than the fast acting current limiter, but it can measure the AC and/or DC spur and/or the associated trunk voltage, as well as the AC and/or DC spur current, by inference and/or direct measurement. It will be appreciated that to meet the standards of Intrinsic Safety the fast acting current limiter needs to be in place, and in situations where both the current limiter and the micro-controller would react to a fault the current limiter will act first in the conventional way, before the current reference is lowered by the micro-controller and the current limiter enters a foldback mode.

In a preferred construction the micro-controller can monitor the spur using analogue measurements. An analogue to digital converter can be interposed between the sensing points and the micro-controller. One reason for analogue measurements is to monitor AC activity, for example the signal on the spur and/or the associated trunk. The analogue measurements can be taken before or after the point of rectangular current limiting in the circuit. One advantage of measuring the output voltage of the current limiter is that the state of the third MOSFET can be assessed, and from this it can be inferred, with the use of current measurement, the load or fault resistance and/or impedance.

Another reason for measuring the current to the load is that modulated signalling from other fault detection devices on the spur can be detected. With the steady state quiescent current minus the known modulation, the micro-controller can send a diagnostic warning to an operator. In addition, the micro-controller could be arranged to determine autonomously at which point the spur should be isolated to prevent a developing fault from reaching a critical level. Such autonomous isolation could occur if the fault detection warning modulation is ignored by the operator, but the actual fault is just about to cause the segment to fail or cause physical damage, for example galvanic corrosion. With such specific knowledge of a developing fault spur isolation can be initiated to prevent that fault from reaching a level where the current on the spur reaches the current reference.

This kind of dynamic fault detection can extend to the use of adaptive current trip points. The micro-controller can be programmed with threshold levels according to the circuit design, so it is bespoke for the spur in question. For example, if the average current of a device is 20 mA and the current reference is 50 mA, a warning can be issued and/or isolation action taken if the current drifts up to 30 mA or down to 10 mA. As such, the fault protection circuit would trip based on adaptive and/or fixed over and/or under current situations. In another example, for devices that have two stage quiescent currents the character can be monitored and adaptive trip points can be applied. In particular, if two currents are detected but the signalling and all other parameters are healthy then the micro-controller can ignore this, only isolating or issuing a warning if one or the currents is outside the expected current range. It would also be possible to use adaptive current trip points according to the current progression of the devices on the spur. The trip points would depend on the manner in which the devices have higher signal levels and/or quiescent currents at higher or lower DC Voltages.

When any of these various faults are detected by the micro-controller according to its programming, the activation signal can be issued to isolate the fault and lower the current reference. The pre-determined faults upon which the micro-controller acts can be synchronous with those the current limiter would react to, as referred to above, but not necessarily. It is possible to allow the current limiter to simply behave as it otherwise would under certain fault conditions. However, where a fault involves the spur current hovering around the current reference, leading to intermittent activation of the current limiter, such a scenario could be detected by the micro-controller and acted upon to prevent such behaviour by introducing a clean fault with the shunt short circuit.

The lowering of the current reference, introducing a foldback function to the current limiter, means that a low spur current is available for diagnostic purposes. This would not be the case if the current limiter were isolated and switched off. In the first instance, the fact that the current limiter is not switched off allows for a visual annunciation to be derived in a simple way from the voltage drop across the third MOSFET. However, more importantly, if the spur isolation is subsequently lifted, connecting the lowered spur current to the fault, the voltage to the spur can be monitored, thus inferring the fault resistance or impedance. With voltage measurement at the spur output, and current measurement it is possible to discern between a constant current or infinite impedance type load and a resistive or conductive type fault. Armed with this information appropriate action can be taken, for example it may not be necessary to isolate a constant current fault at high currents, but to isolate a resistive fault at low currents.

The lowered spur current can also be used for other kinds of fault probing to asses the state of the spur, and such an arrangement may be better than employing any of the known much higher fault test currents. In addition, the micro-controller can be programmed to dynamically vary the current reference, and therefore the current supplied to the spur. This can be done to introduce current to the spur in a non-disruptive way upon cessation of a fault, for power dissipation reduction, or as a function of fault probing.

Therefore, according to a second aspect of the present invention, a method of using a fault protection circuit for use on a spur of an IEC 61158 Fieldbus network comprising a fast acting current limiter adapted to limit the spur current to the level of a reference current when the spur current reaches said reference current, control means adapted to monitor the spur AC and/or DC current and/or voltage, and isolation means adapted to apply a shunt short circuit isolation to said spur upon receipt of an activation signal from the control means, in which the control means is adapted to control the level of the reference current, and in which when said control means detects one or more pre-determined fault conditions on said spur it activates the isolation means and lowers the level of reference current, comprises the following steps:

i) after the control means activates the isolation means and lowers the level of the reference current, ceasing the activation signal to the isolation means such that the limited current is supplied to the spur, ii) monitoring the spur AC and/or DC current and/or voltage to diagnose the nature of faults on the spur.

It will be appreciated that there are many way the above method could be applied to achieve different aims. For example, the time delay before ceasing the activation signal can be varied depending on the nature of the detected fault, and the reaction of the micro-controller to the diagnostic information available when the limited current is applied to the spur can vary depending on what is detected. For instance, if the fault persists the system can enter a feedback loop until the fault clears, or the isolation can be constant until remedial action is taken. If the fault has cleared upon connection of the limited current to the spur, the manner in which the level of the current is raised can depend on pre-determined criteria, for example it can be a stepped increase or an immediate increase up to normal levels.

As referred to above, the method can comprise the following further step:

iii) varying the reference current to adjust the spur current in order to probe for faults on the spur.

Again, how this is done can be pre-determined and be based on the nature of the originally detected fault. For example, if had been detected that the spur current had crept up to within 10 mA of the reference current, the current reference can be increased immediately to this level to determine if the fault remains.

Therefore, the micro-controller can be programmed in quite complex ways to determine what action is taken for a given set of IEC61158-2 physical layer variables, or a combination of such variables. This is possible because of the sheer amount of diagnostic information available from the spur when it is monitored and controlled in the manner described above by the micro-controller. The different kinds of diagnosis which are possible will be appreciated, and the different courses of action which could be taken will be a matter of choice for the operator. The skilled person knowledgeable in Fieldbus network physical layer diagnosis and fault rectification will be able to use the fault protection circuit in all sorts of ways as desired, and as such exhaustive details of all the possible methods of use are not given here.

However, the method of the invention can comprise the following further step:

iii) activating the isolation means for a pre-determined period at fixed, varied or random time intervals.

Therefore, the micro-controller can be programmed to isolate a detected fault a fixed time intervals, longer or shorter time intervals or at random time intervals, according to the nature of the detected fault. The advantage of doing this in a random way is that if there is more than one fault in a Fieldbus network which has resulted in spur isolation, the time intervals between cessation of the isolation will not be synchronous in the network. This way the inrush current is curtailed and good signal quality and device voltage levels can be maintained.

Alternatively, the refresh time can be staggered. For instance, after a particular type of fault is first detected the cessation of the isolation can occur shortly after it began, perhaps because such faults can clear quickly. However, if the fault is still present on the spur, the subsequent isolation times can progressively increase, so if a fault is constant the number of telegram reports will decrease over time, avoiding unnecessary disruption. Another significant advantage with this arrangement is that if the fault is due to cable wetting then galvanic corrosion can be eliminated. Often such faults can remain for many hours or even days on unmanned systems, and if a current is supplied for 20 ms of every second the galvanic corrosion time will be enough to cause significant cable erosion requiring major repair work. Of course, upon repair the time to refresh should be minimal. This can be achieved by the use of a manual, remote or automatic reset of the micro-controller. An automatic electro-mechanic system could be used where the reconnection of a spur terminal is interpreted as an instruction to retry.

Figure 2:
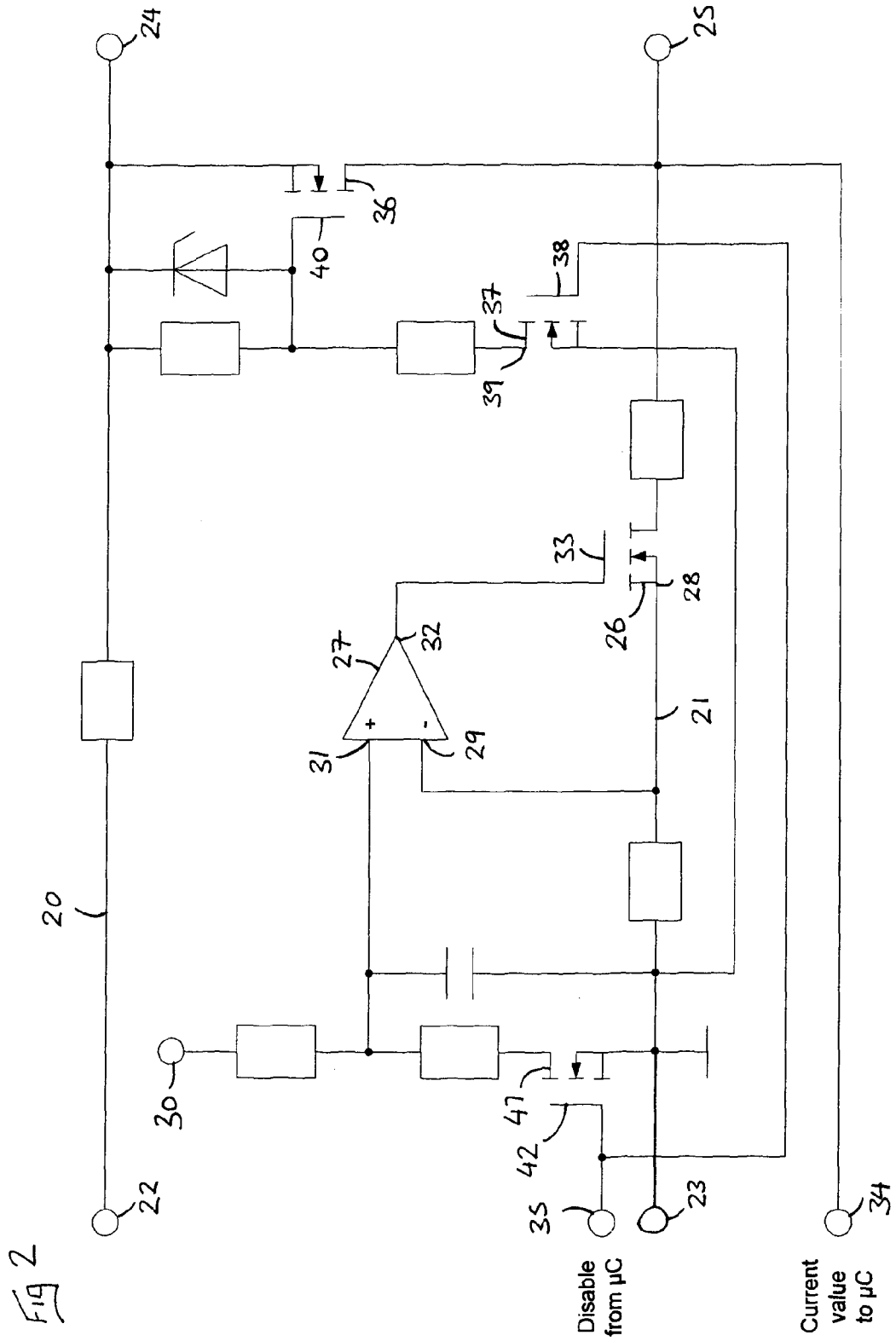

The present invention can be performed in various ways, but two embodiments will now be described by way of example, and with reference to the accompanying drawings, in which FIG. 1 is a diagrammatic view of a fault protection circuit according to the first aspect of the present invention; and, FIG. 2 is a circuit diagram of a fault protection circuit according to the first aspect of the present invention.

As shown in FIG. 1, a fault protection circuit for use on a spur 5 of an IEC 61158 Fieldbus network comprises a fast acting current limiter 4 adapted to limit the spur current to the level of a reference current 2 when the spur current reaches said reference current 2, control means, in the form of micro-controller 9, adapted to monitor the spur AC and/or DC current and/or voltage, by means of measurements 8 and 8', and isolation means, in the form of switchable element 12, adapted to apply a shunt short circuit isolation to said spur 5 upon receipt of an activation signal 7 from the control means 9. The control means 9 is adapted to control the level of the reference current, as shown at 10, and when said control means 9 detects one or more pre-determined fault conditions on said spur 5 it activates the isolation means 12 and lowers the level of reference current 2.

The basic circuit shown in FIG. 1 is a fast acting, adjustable rectangular current limiter 4 disposed between a Fieldbus trunk 3 and a Fieldbus device 6, attached to a Fieldbus spur 5. The rectangular current limiter 4 comprises an internal current sense resistor (not shown in FIG. 1) with proportional constant current control governed by the current reference 2 from the programmable voltage reference source 1, or from a fixed set point 11. Up to this point the circuit is known art.

However, via the measurements 8 and 8' (8' being on the trunk 3) the micro-controller 9 can detect the spur AC and/or DC current and/or voltage levels, and it is programmed to react when it detects physical layer characteristics indicative of any one of a number of particular faults occurring on the spur 5. The manner in which the micro-controller is programmed, and the exact types of fault it is set-up to detect, is a matter of choice for the operator. The kinds of faults which can be detected in this way are numerous, and are discussed above. Primarily these are faults which are not efficiently handled by the known current limiter 4.

When such a fault is detected the micro-controller 9 issues an activation signal which switches the element 12 to present a shunt short circuit across the rails of the spur 5. Therefore the micro-controller 9 deliberately creates a clean fault on the spur 5 in the form of a shunt short circuit. In this way the current limiter 4 is forced into action to handle this contrived "fault", and does not remain inactive. In addition, the micro-controller 9 lowers the level of the current reference 2 in order to protect a current sense series element part of the current limiter 4 from overheating when the shunt short circuit is applied. Lowering the current reference 2 in this way is effectively the application of a low current foldback mode to the current limiter 4, which otherwise would operate in a rectangular fashion.

In some situations both the current limiter 4 and the micro-controller 9 will react to a fault on the spur 5, and if so the current limiter 4 will react first, before the micro-controller 9 then issues the activation signal. The switching of the element 12 to present a shunt short circuit will not achieve anything as the current limiter 4 will already be in current limit mode, but the lowering of the current reference 2 will place the current limiter 4 in a low current foldback mode.

The micro-controller 9 monitors the spur 5 using analogue measurements 8 and 8'. Analogue to digital converters ADC are interposed between the sensing points and the micro-controller 9. This allows the micro-controller 9 to monitor AC activity, for example the signal on the spur 5 and on the trunk 3. As is clear from FIG. 1 measurement 8 is taken after the point of rectangular current limiting in the circuit. One advantage of measuring the output voltage of the current limiter 4 in this way is that the state of the series element within it can be assessed, and from this it can be inferred, with the use of current measurement, the load or fault resistance and/or impedance. In addition, this arrangement also allows for the detection of modulated signalling from fault detection devices (not shown) on the spur 5, for example a water ingress detector in device 6.

As referred to above, the micro-controller 9 can be programmed to deal with detected faults in numerous ways, including taking action when the detected physical layer characteristics suggest that a fault is about to occur. This can also extend to the use of adaptive current trip points to accommodate the spur 5 design.

Once a fault has been detected and action taken to isolate the spur 5, the lowered reference current 2 can then be used for diagnostic purposes. In particular, the micro-controller 9 can stop sending the activation signal 7 to the switchable element 12 so the spur 5 is supplied with the lowered current. As such, the voltage to the spur 5 can be monitored, thus inferring the fault resistance or impedance. With voltage measurement at the spur 5 output, and current measurement it is possible to discern between a constant current or infinite impedance type load and a resistive or conductive type fault. Armed with this information appropriate action can be taken by the micro-controller 9, for example it may not isolate a constant current fault at high currents, but isolate a resistive fault at low currents. Information about the fault can also be sent to the control room.

Further, the micro-controller 9 can be programmed to dynamically vary the current reference 2, and therefore the current supplied to the spur 5. As described above this can be done to introduce current to the spur 5 in a non-disruptive way upon cessation of a fault, for power dissipation reduction, or as a function of fault probing.

In addition, the micro-controller 9 can be programmed to re-connect the spur 5 to the lowered current according to a pre-determined rationale, including according to the nature of the detected fault, according to fixed or random repeated time frames, or according to staggered time frames. Once again, these methods and the advantages associated with them are as discussed above.

In some fault conditions the micro-controller 9 is programmed to allow the current limiter 4 to simply react as it otherwise would, by limiting the current on the spur 5 according to the current reference 2.

FIG. 2 shows a practical circuit diagram for carrying out the above described fault protection circuit. FIG. 2 shows the positive 20 and negative 21 rails of the fault protection circuit between bus terminals 22 and 23 and spur terminals 24 and 25. The current limiter comprises third MOSFET 26 and op-amp 27. The source terminal 28 of the third MOSFET 26 is fed to the negative terminal 29 of the op-amp 27 and a reference current 30 is fed to the positive terminal 31 of the op-amp 27. The output 32 of the op-amp 27 is fed to the gate terminal 33 of the third MOSFET 26, such that when the spur current as sensed by the third MOSFET 26 from the negative rail 21 reaches the reference current 30 the third MOSFET 26 is controlled to limit the spur current to the level of the reference current 30. This is a known current limiter arrangement. It will be appreciated that various resistors are placed in this circuit for practical application reasons.

An input terminal 34 of the micro-controller is connected to the negative rail of the circuit 21 to detect the spur current. An output terminal 35 of the micro-controller issues a binary disable signal, which is fed to two MOSFETS.

A first MOSFET 36 is mounted across the rails of the spur, which can be driven to a short circuit state upon receipt of the disable signal. This is advantageous because the first MOSFET 36 can present total spur output isolation from the fault. The first MOSFET 36 is a low ohmic rail to rail MOSFET, so that no current will flow into a low resistance or low impedance, high resistance fault, but current will flow through the current limiter, and optionally any associated diagnostic system, for example a fault annunciation circuit (not shown).

As will be appreciated from FIG. 2, the first MOSFET 36 is controlled by a second MOSFET 37. The disable signal is supplied to a gate terminal 38 of the second MOSFET 37, and a drain terminal 39 thereof is fed to the gate terminal 40 of the first MOSFET 36. This way an inverter circuit is provided to activate the first MOSFET 36 in an efficient way.

A fourth MOSFET 41 is mounted in series with the reference current 30, between it and ground, a gate terminal 42 thereof being controlled by the output terminal 35 of the micro-controller. Therefore, upon detection of a fault the disable signal is transmitted, the first MOSFET is driven to present a shunt short circuit, and the reference voltage is driven down. This can be from about 56 mA down to 10 mA. It will be appreciated that with this arrangement the current reference can be precisely controlled by the micro-controller through the fourth MOSFET 41, by varying the strength of the disable signal. This has no effect on the operation of the first MOSFET 36 because it is driven by the inverter structure regardless of the strength of the disable signal.

The micro-controller can also adjust the reference current 30 directly for fault probing and power re-introduction purposes.

The manner in which the circuit shown in FIG. 2 is used to carry out the methods and functions described above in relation to FIG. 1 will be apparent to the skilled person. In particular, it primarily involves the specific programming of the micro-controller as desired.

However, FIG. 2 does illustrate how the invention creates a closed loop constant current circuit where no current flows to the load, but it does advantageously flow through the fault protection components. This is by virtue of the impedance which is left in this closed loop circuit.

The second aspect of the present invention is a method of using a fault protection circuit, and the above described embodiments and the accompanying description provide full support for this method.

Therefore, the present invention provides a fault protection circuit which overcomes the flaws in known simple current limiting devices by detecting and protecting against a far wider set of fault conditions. It is also able to detect physical layer diagnostic variables sent by warning probes, for example leakage detection systems which modulate the spur current with high impedance modulation. Further, the fault protection circuit also comprises useful diagnostic features, and it can also adjust its behaviour to suit particularly defined fault situations.

The invention claimed is:

1. A fault protection circuit for use on a spur of an IEC 61158 Fieldbus network comprising a fast acting current limiter adapted to limit the spur current to the level of a reference current when the spur current reaches said reference current, control means adapted to monitor the spur AC and/or DC current and/or voltage, and isolation means adapted to apply a shunt short circuit isolation to said spur upon receipt of an activation signal from the control means, in which the control means is adapted to control the level of the reference current, and in which when said control means detects one or more pre-determined fault conditions on said spur it activates the isolation means and lowers the level of reference current.

2. The fault protection circuit as claimed in claim 1 in which the isolation means comprises a first MOSFET mounted across rails of the spur, which is driven to a short circuit state upon receipt of the activation signal at a gate terminal thereof.

3. The fault protection circuit as claimed in claim 2 in which the activation signal from the control means is supplied to a gate terminal of a second MOSFET, in which a drain terminal of the second MOSFET is supplied to the gate terminal of the first MOSFET, such that an inverter circuit is provided to activate the first MOSFET.

4. The fault protection circuit as claimed in claim 3 in which the current limiter comprises a third MOSFET and an op-amp, in which a source terminal of the third MOSFET is fed to a negative terminal of the op-amp and the reference current is fed to a positive terminal of the op-amp, in which an output of the op-amp is fed to a gate terminal of the third MOSFET, such that when the spur current reaches the reference current the third MOSFET is controlled to limit the spur current to the level of the reference current, and in which a fourth MOSFET is mounted in series with said reference current, a gate terminal thereof being controlled by the control means thereby to control the level of the reference current.

5. The fault protection circuit as claimed in claim 4 in which said control means is a micro-controller, in which said activation signal comprises a disable signal which is fed to the gate terminals of both the second and fourth MOSFETs.

6. A method of using a fault protection circuit for use on a spur of an IEC 61158 Fieldbus network comprising a fast acting current limiter adapted to limit the spur current to the level of a reference current when the spur current reaches said reference current, control means adapted to monitor the spur AC and/or DC current and/or voltage, and isolation means adapted to apply a shunt short circuit isolation to said spur upon receipt of an activation signal from the control means, in which the control means is adapted to control the level of the reference current, and in which when said control means detects one or more pre-determined fault conditions on said spur it activates the isolation means and lowers the level of reference current, in which said method comprises:

i) after the control means activates the isolation means and lowers the level of the reference current, ceasing the activation signal to the isolation means such that the limited current is supplied to the spur, ii) monitoring the spur AC and/or DC current and/or voltage to diagnose the nature of faults on the spur.

7. The method according to claim 6 further comprising:

iii) varying the reference current to adjust the spur current in order to probe for faults on the spur.

8. The method according to claim 6 further comprising:

iii) activating the isolation means for a pre-determined period at fixed, varied or random time intervals.

* * * * *